(12) United States Patent
Fujii et al.

(10) Patent No.: US 8,123,362 B2
(45) Date of Patent: Feb. 28, 2012

(54) LAMP BURST SOUND REDUCTION STRUCTURE AND PROJECTOR

(75) Inventors: Hiroaki Fujii, Kanagawa (JP); Takuji Ohkubo, Chiba (JP); Yoshiro Asano, Chiba (JP); Nobuaki Higuchi, Kanagawa (JP)

(73) Assignee: Sony Corporation (JP)

( * ) Notice: Subject to any disclaimer, the term of this patent is extended or adjusted under 35 U.S.C. 154(b) by 698 days.

(21) Appl. No.: 11/900,924

(22) Filed: Sep. 12, 2007

(65) Prior Publication Data

US 2008/0100807 A1 May 1, 2008

(30) Foreign Application Priority Data

Sep. 14, 2006 (JP) ................................ P2006-250147

(51) Int. Cl.
*G03B 21/16* (2006.01)
(52) U.S. Cl. ............................................ 353/60; 353/61
(58) Field of Classification Search .................. 353/57, 353/58, 59, 60, 61
See application file for complete search history.

(56) References Cited

U.S. PATENT DOCUMENTS

| 5,860,719 | A  | * | 1/1999  | Suzuki et al. ................... 353/61 |
| 6,837,583 | B2 |   | 1/2005  | Gishi et al. |
| 6,913,361 | B2 |   | 7/2005  | Gishi et al. |
| 6,942,348 | B2 |   | 9/2005  | Gishi et al. |
| 7,029,123 | B2 |   | 4/2006  | Gishi et al. |
| 7,140,734 | B2 | * | 11/2006 | Lim ................................ 353/61 |
| 7,618,145 | B2 | * | 11/2009 | Lee et al. ........................ 353/61 |
| 2002/0129863 | A1 |   | 9/2002  | Schaake et al. |
| 2003/0179579 | A1 |   | 9/2003  | Hsu et al. |

FOREIGN PATENT DOCUMENTS

| JP | 11-119181 A    | 4/1999 |
| JP | 2001-222065 A  | 8/2001 |
| JP | 2003-005292 A  | 1/2003 |
| JP | 2003-023282 A  | 1/2003 |
| JP | 2006-145854 A  | 6/2006 |
| JP | 2006-243361 A  | 9/2006 |

* cited by examiner

*Primary Examiner* — Que T Le
*Assistant Examiner* — Jerry Brooks
(74) *Attorney, Agent, or Firm* — Lerner, David, Littenberg, Krumholz & Mentlik, LLP

(57) ABSTRACT

There is provided a lamp burst sound reduction structure which may have an enlarged part in an intermediate position of a duct through which cooling air for cooling a light emitting unit of a lamp flows, the enlarged part may have a cross section area larger than a cross section area of the duct, the lamp being a light source of a projector.

1 Claim, 9 Drawing Sheets

| FREQUENCY(Hz) | ENLARGED PART FLOW PATH NOT PROVIDED(dB) | ENLARGED PART FLOW PATH PROVIDED(dB) |
|---|---|---|
| 31.5 | 50 | 50 |
| 63 | 50 | 52.3 |
| 125 | 58.3 | 63.1 |
| 250 | 72 | 78.5 |
| 500 | 82 | 87.1 |
| 1000 | 85.8 | 90.2 |
| 2000 | 89.8 | 91.2 |
| 4000 | 91.3 | 88.2 |
| 8000 | 91.4 | 84.5 |

LAMP BURST SOUND REDUCTION STRUCTURE AND PROJECTOR

CROSS-REFERENCE TO RELATED APPLICATIONS

This application claims priority from Japanese Patent Application No. JP 2006-250147 filed in the Japanese Patent Office on Sep. 14, 2006, the entire content of which is incorporated herein by reference.

BACKGROUND OF THE INVENTION

1. Field of the Invention

The present invention relates to a burst sound reduction structure of a lamp light-emitting unit of a projector that projects an image on a screen with a lamp as a light source, and to a projector that has this structure.

2. Description of Related Art

In the past, this type of projector has a lamp that is a light source and has an optical system unit that generates a color image from a white light output from this lamp, a power supply box that supplies power to the lamp and so on, and a cooling unit that sends air to the optical system unit, the lamp, and the power supply box for cooling them. The projector has a duct that is a path of air flow from the cooling unit.

The lamp includes a light emitting unit, a bowl-shaped concave reflecting mirror that reflects the light emitted from the light emitting unit, and a translucent plate which covers an opening of the concave reflecting mirror and from which an emitted light of the light emitting unit is output.

At the edge of the opening of the concave reflecting mirror, an air intake slot and an air exhaust slot are provided in the opposite positions across the light emitting unit. Cooling air flowing through the duct is taken in from the air intake slot, absorbs heat of the light emitting unit, and is exhausted externally from the air exhaust slot via an air intake duct.

A projector similar to the projector described above is disclosed in Japanese Patent Application Publication (KOKAI) No. 2003-005292.

SUMMARY OF THE INVENTION

The light emitting unit of the lamp emits not only light but also a lot of heat. So, the long use of the projector with the lamp on overheats and sometimes bursts the light emitting unit with a result that burst sound leaks outside the unit through the air intake slot and the air exhaust slot. This burst sound, a high-pitched sound containing high-frequency components, surprises users, hurts their ears, and makes them feel uncomfortable.

In view of the foregoing, there is a need for providing a lamp-burst-sound reduction structure and a projector having this structure that lower the burst sound frequency low enough to reduce the user's uncomfortable feeling.

To solve the problems lying in the related art, a lamp burst sound reduction structure according to an embodiment of the present invention may have an enlarged part, which has a cross section area larger than that of a duct, in an intermediate position of the duct through which cooling air flows for cooling a light emitting unit of a lamp that is a light source of a projector. The enlarged part, provided in the intermediate position of the duct, may reduce a frequency, tone quality, and a sound pressure level of a burst sound generated when the light emitting unit of the lamp bursts.

A projector according to an embodiment of the present invention may include an optical system unit, a lamp that is a light source of the optical system unit, and a cooling unit that sends air to the lamp for cooling. In addition, an enlarged part, which has a cross section area larger than that of a duct, may be provided in an intermediate position of the duct through which cooling air for cooling the light emitting unit of the lamp flows. This structure provides a projector that may reduce a frequency, tone quality, and a sound pressure level of a burst sound generated when the light emitting unit of the lamp bursts.

DETAILED DESCRIPTION

Embodiments of the present invention will be described below in detail with reference to the drawings.

Figure 1:
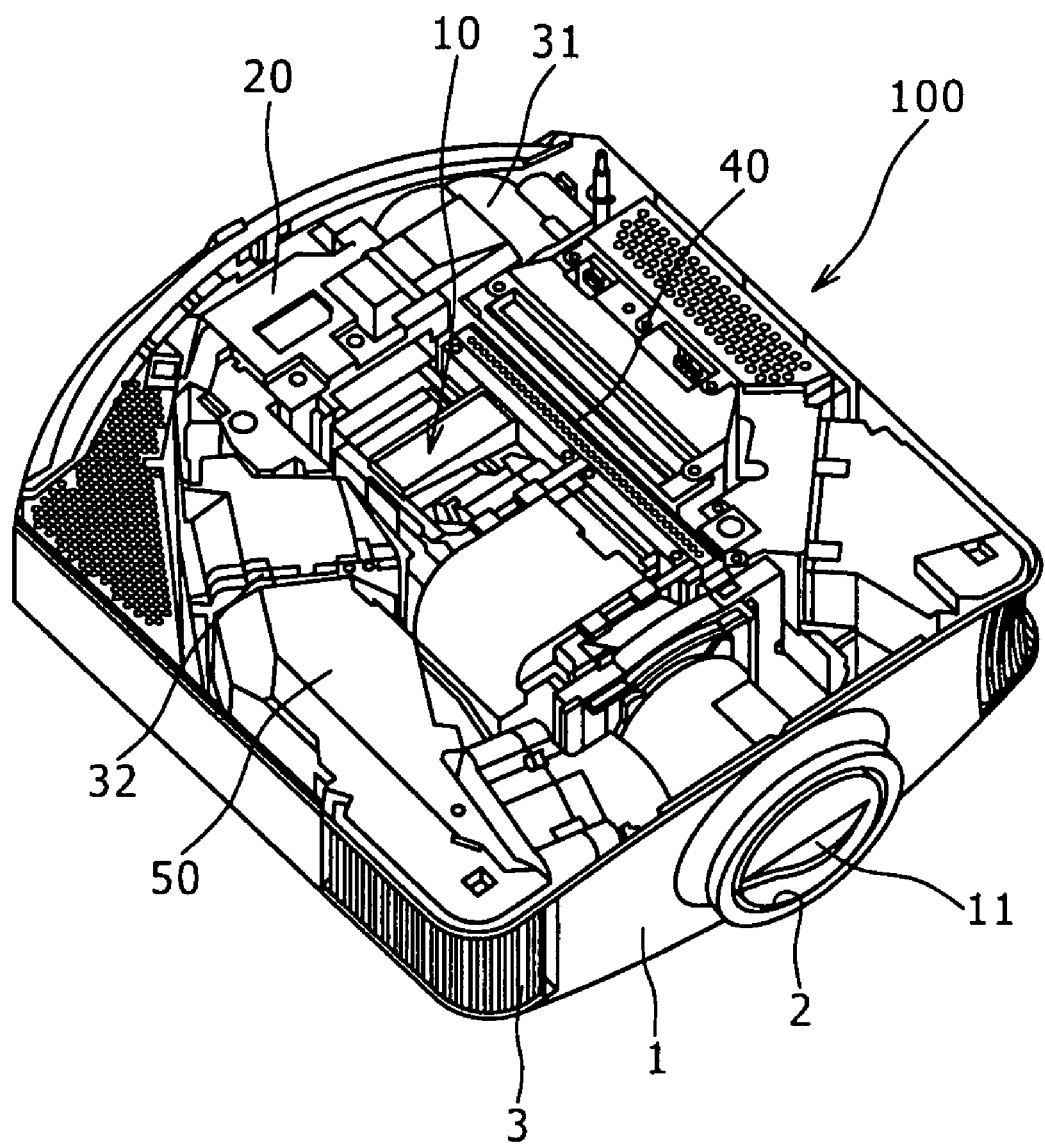
FIG. 1 is a perspective view of the internal structure of a projector in one embodiment of the present invention.
Figure 2:
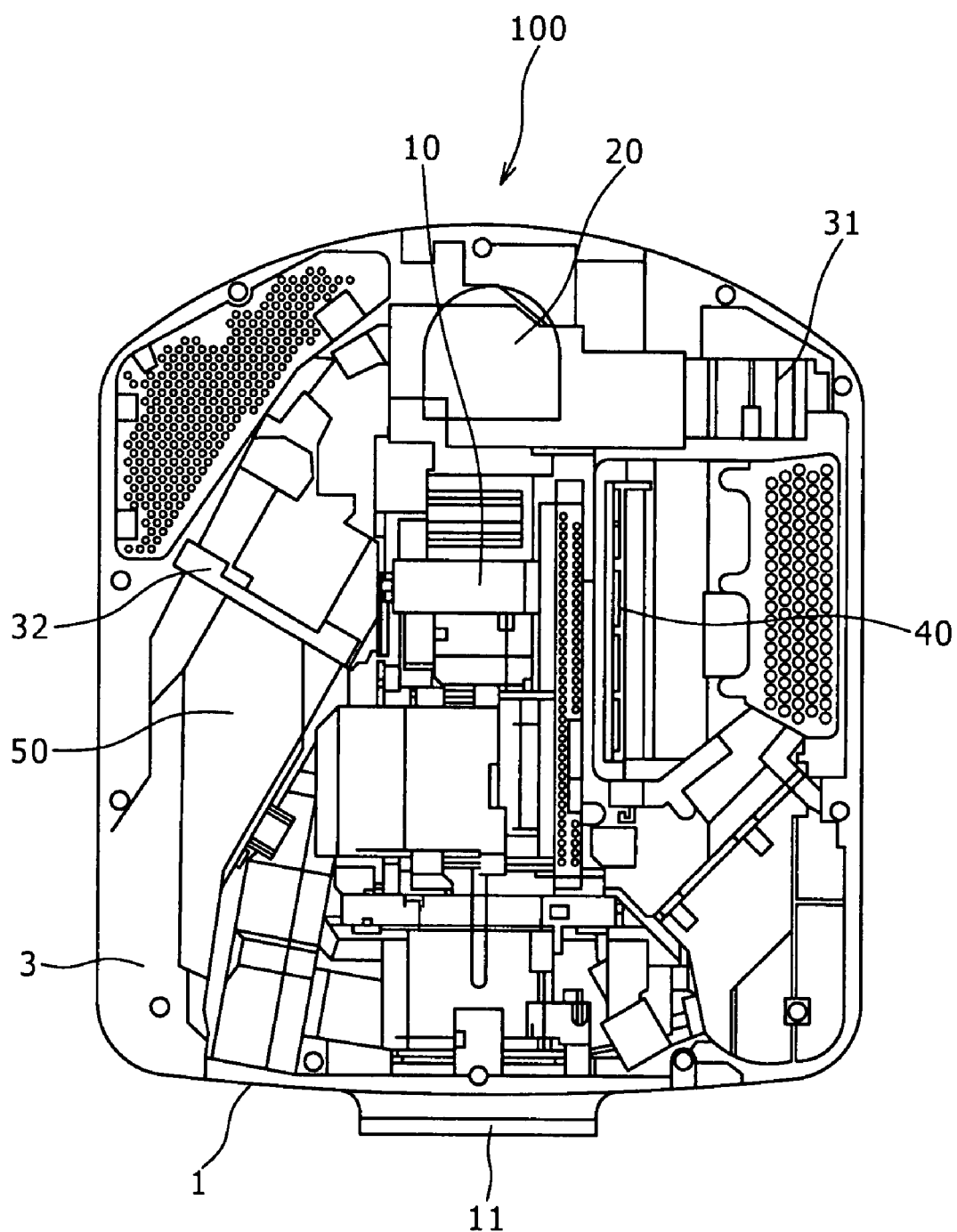
FIG. 2 is a top view showing a configuration of the projector shown in FIG. 1.

FIG. 1 is a perspective view showing an internal structure of a projector in one embodiment of the present invention, and FIG. 2 is a top view showing a configuration of the projector.

Referring to FIGS. 1 and 2, a projector 100 has a casing 1 and, within this casing 1, has an optical system unit 10 that generates a color image, a lamp unit 20 that works as a light source of the optical system unit 10, a power supply box 40 that supplies power to the lamp unit 20 and so on, a sirocco fan 31 that sends air to the optical system unit 10, the lamp unit 20, and the power supply box 40 for cooling them, an axial flow fan 32 that exhausts warm air from the optical system unit 10, the lamp unit 20, and the power supply box 40, and a duct 50 through which air flows.

The casing 1 has a projection window 2 on its front for projecting a color image, and has exhaust slots 3 provided on both sides of the projection window 2 for exhausting air from the lamp unit 20 and so on. The projection window 2 has a projection lens 11 installed.

The optical system unit 10 converts a white light, received from the lamp unit 20, to a color image light and, via the projection lens 11, projects an enlarged image on a screen installed ahead of the projector. In addition to the projection lens 11, the optical system unit 10 has a reflecting mirror (not shown).

Figure 3:
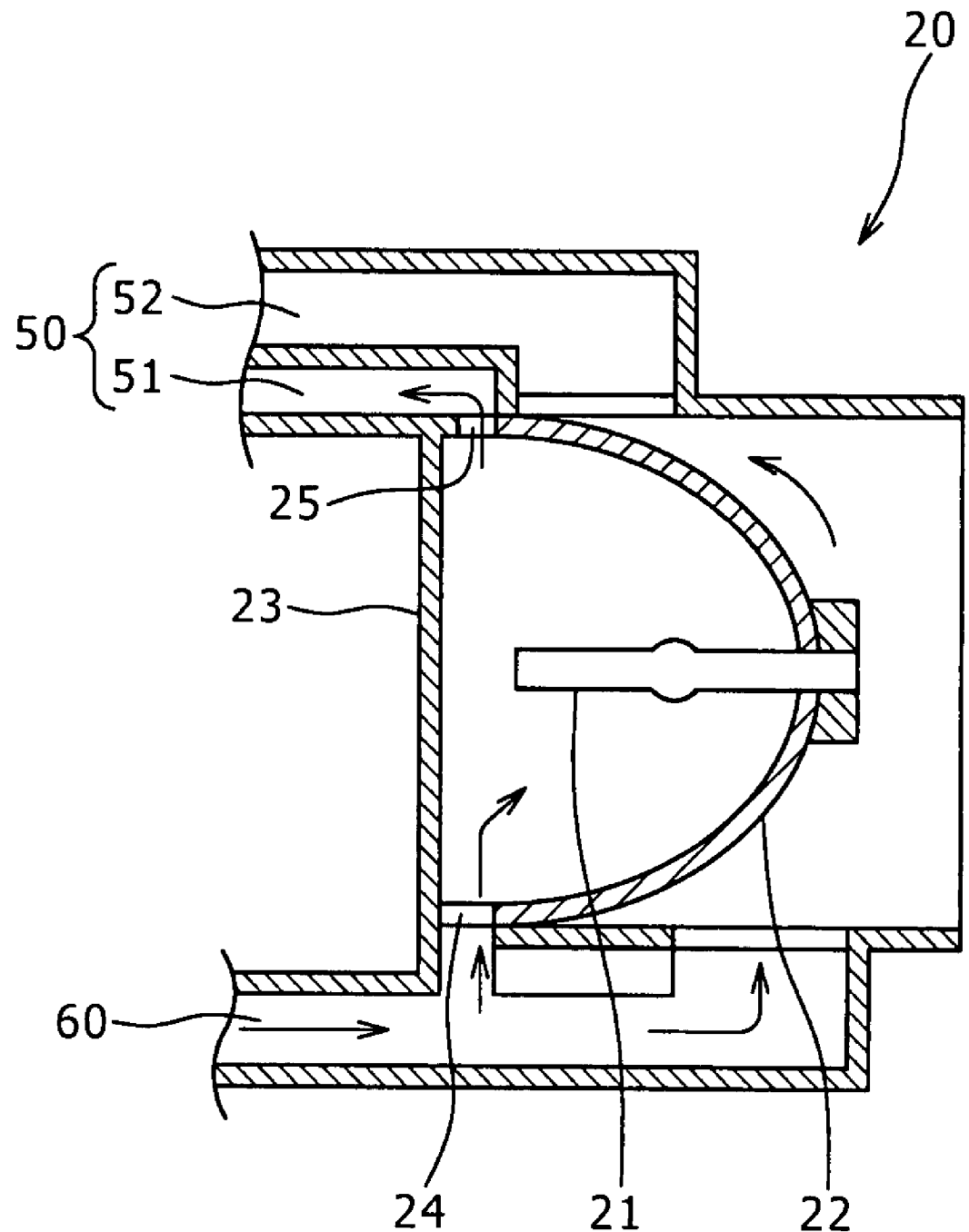
FIG. 3 is a cross section view of a lamp unit and a duct shown in FIG. 1.

As shown in FIG. 3, the lamp unit 20 has a light emitting unit 21 in the center and comprises a concave reflecting mirror 22 that reflects a light emitted from the light emitting unit 21 and a translucent plate 23 which covers an opening of the concave reflecting mirror 22 and from which the emitted light from the light emitting unit 21 is output.

An air intake slot 24 is formed on an edge of the opening of the concave reflecting mirror 22, and an air exhaust slot 25 from which air inside the concave reflecting mirror 22 is exhausted is formed in the position opposite to the air intake slot 24 across the light emitting unit 21. The duct 50 is made up of a first duct 51 connected to the air exhaust slot 25 and a second duct 52 from which cooling air, taken in from an take-in duct 60, is exhausted via the outside of the concave reflecting mirror 22.

When the power of the projector 100 is turned on, the sirocco fan 31 and the axial flow fan 32 start rotation. Those fans, when started, cause cooling air from the duct 60 to be taken in from the air intake slot 24 into the inside of the concave reflecting mirror 22 to cool the light emitting unit 21 and, after that, to be exhausted outside via the air exhaust slot 25 and the first duct 51. The cooling air, taken into the duct 60, is also sent outside the concave reflecting mirror 22 to cool the concave reflecting mirror 22 and, after that, exhausted externally from the second duct 52.

Figure 4:
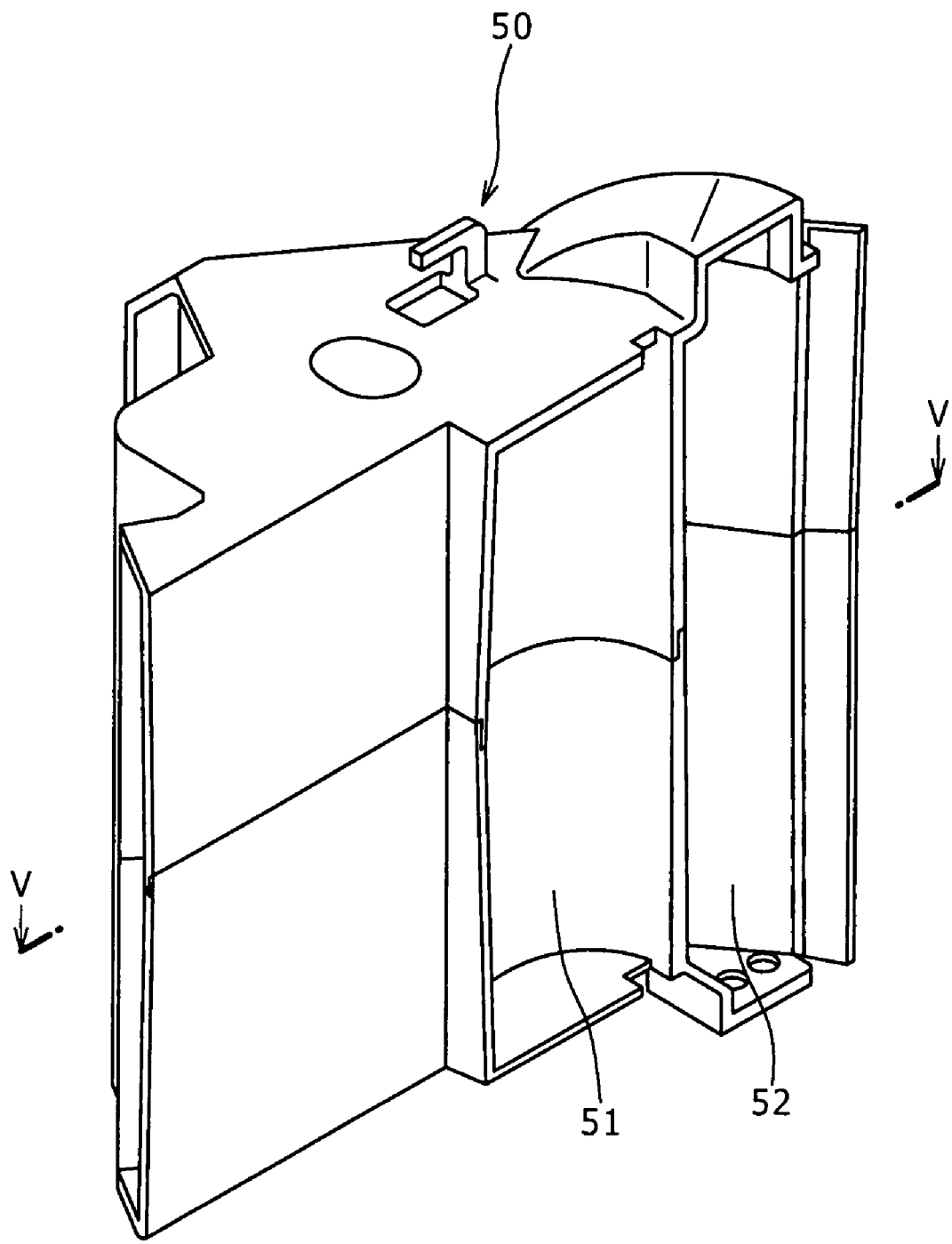
FIG. 4 is a perspective view of a principal part of the duct shown in FIG. 1.
Figure 5:
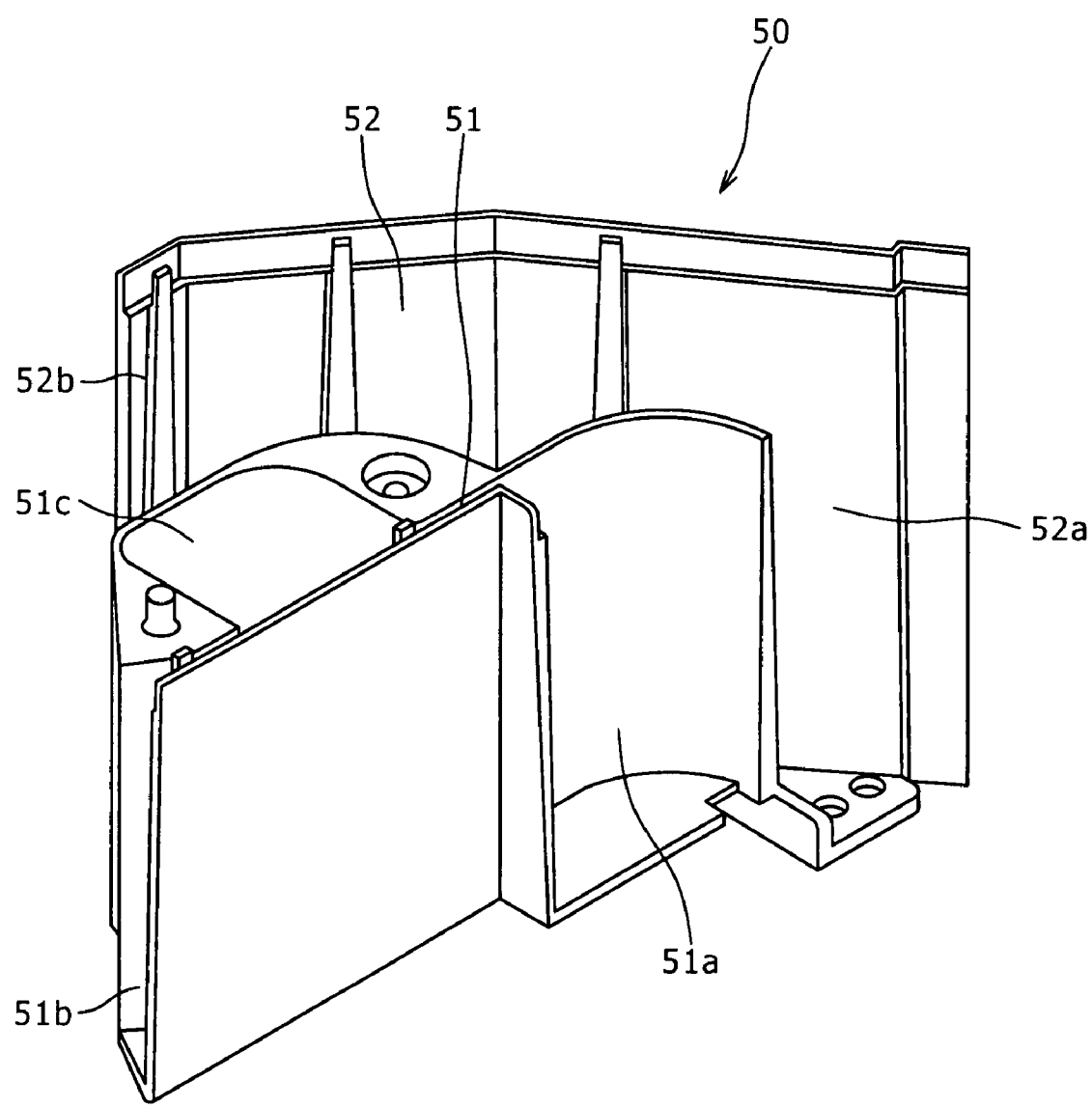
FIG. 5 is a perspective view of the duct shown in FIG. 4 taken on line V-V.
Figure 6:
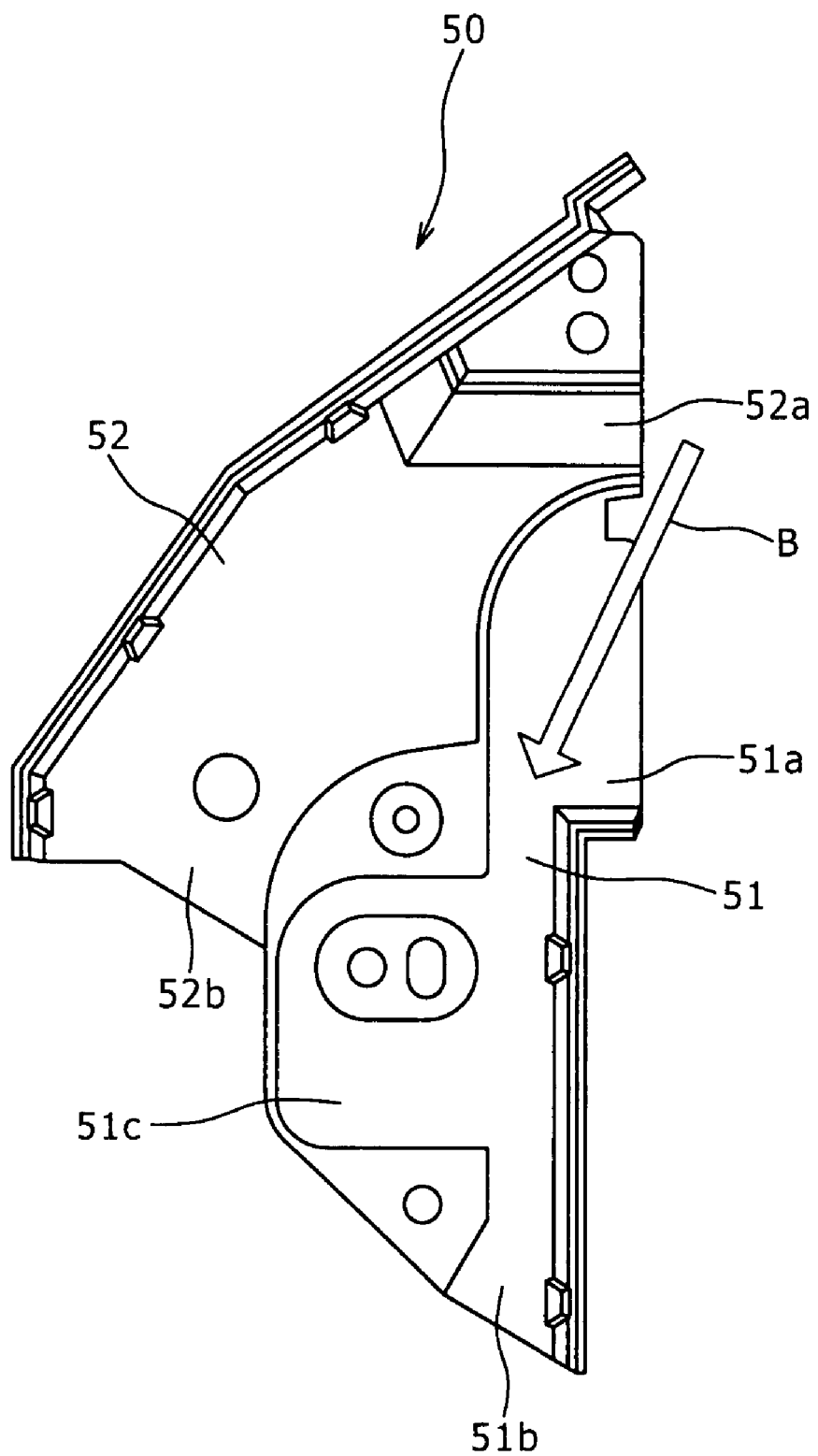
FIG. 6 is a top view of the duct shown in FIG. 5.

Next, the following describes the duct 50 with reference to FIG. 4 to FIG. 6.

Referring to FIG. 4, the duct 50 has the first duct 51 and the second duct 52 with their top halves and the bottom halves combined into one structure. FIG. 5 shows the bottom half of the duct 50 that is separated from the top half at line V-V of the duct 50 shown in FIG. 4.

An opening 51a of the first duct 51 faces the inside of the concave reflecting mirror 22 where the light emitting unit 21 of the lamp unit 20 is provided, and an opening 51b faces a part where the axial flow fan 32 is provided. In this first duct 51, an enlarged part 51c having a cross section area larger than that of the first duct 51 is formed in a predetermined position between the opening 51a and the opening 51b. The enlarged part 51c has a square cross section and extends toward the second duct 52. An opening 52a of the second duct 52 faces an area outside of the concave reflecting mirror 22, and an opening 52b faces the part where the axial flow fan 32 is provided.

Referring to FIG. 6, the enlarged part 51c provided in the first duct 51 blocks a path of a reflecting light B emitted from the lamp unit 20, prevents unwanted diffusion of light from the projector 100, and allows a user to enjoy the projection in an ideal environment.

As described above, the enlarged part 51c having the cross section larger than that of the first duct 51 is formed in the first duct 51 in this embodiment, and this enlarged part 51c lowers a frequency, tone quality, and a sound pressure of a burst sound generated by the light emitting unit 21 of the lamp unit 20. Therefore, this structure prevents the user from being surprised and suppresses uncomfortable sounds offensive to the ears. A loud sound of high tone becomes a lower one which makes the user feel less uncomfortable.

Figures 7, 8:
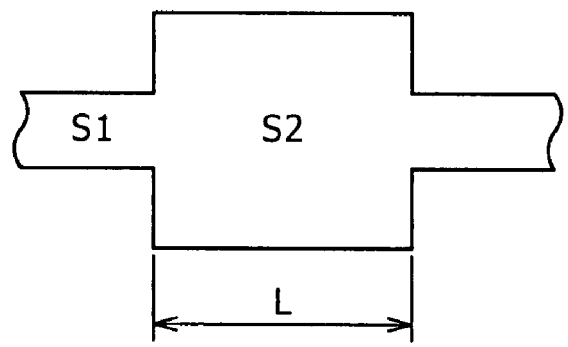
FIG. 7 is a diagram showing an effect of frequency reduction of a burst sound.
FIG. 8 is a diagram showing the relation between the burst sound and a frequency with and without an enlarged part.

FIG. 7 is a diagram showing the principle of the burst-sound frequency reduction effect.

That is, S1 indicates a cross section area of the first duct 51, S2 indicates a cross section area of the enlarged part 51c, and L indicates a length of the enlarged part 51c.

Let the noise reduction amount be represented as TL=L1−L2 (where L1 is a sound pressure level of the incoming sound at an entrance of a silencer and L2 is a sound pressure level of a transmission sound at an exit). Then, expression (1) given below is satisfied. (Reference: "Practice in Noise Reduction" by Nakano Aritomo, THE NIKKAN KOGYO SHIMBUN, LTD.).

$$TL=10\log(1+\tfrac{1}{4}(m-1/m)2\sin 2kL)\text{dB} \qquad (1)$$

where m=S2/S1; Expansion ratio S1, S2; Cross section area m2, k=2πf/c, L; Length of expanded part m.

The sound reduction frequency of this silencer is determined by the length of the expanded part.

Figure 9:
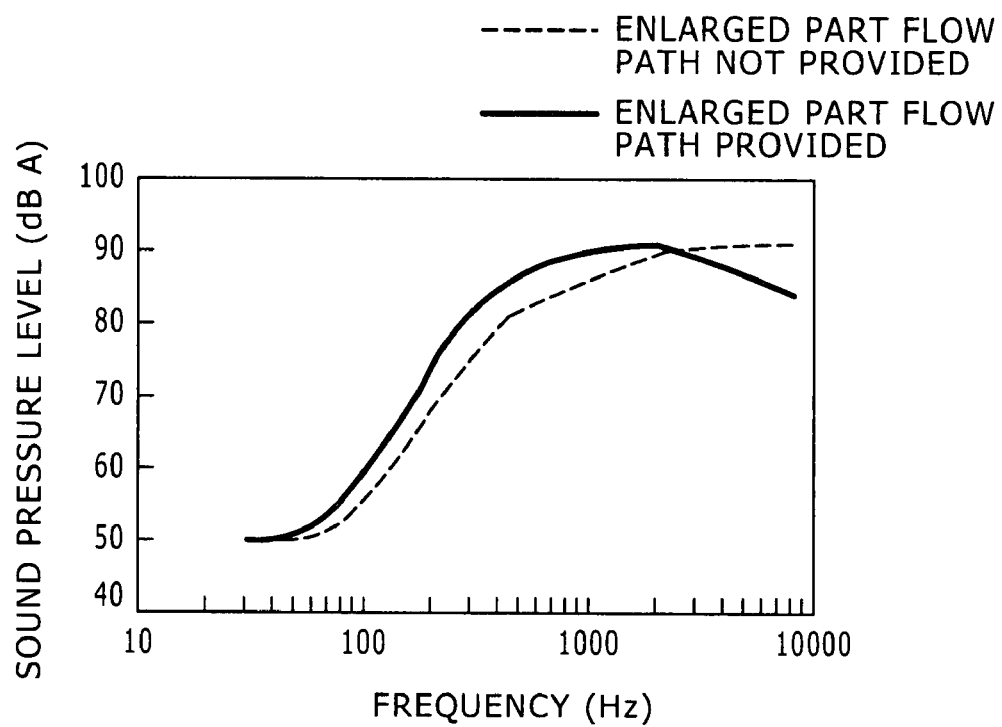
FIG. 9 is a diagram showing the characteristics between a sound pressure level and the frequency with and without the enlarged part.
Figure 10:
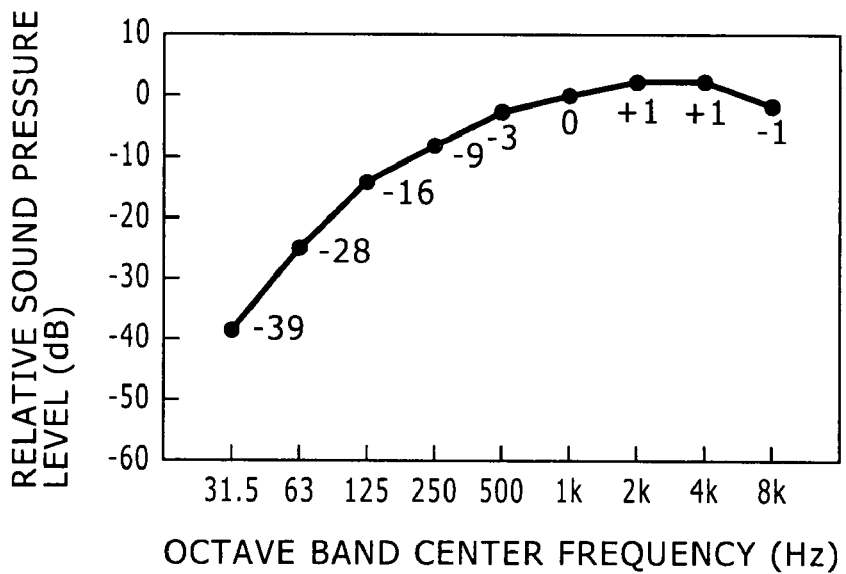
FIG. 10 is a diagram showing the characteristics between a relative sound pressure level and an octave band center frequency.

FIG. 8 is a diagram showing a relation between a burst sound and a frequency with and without the enlarged part. FIG. 9 is a diagram showing the characteristics between a sound pressure level and the frequency with and without the enlarged part. FIG. 10 is a diagram showing the characteristics between a relative sound pressure level and an octave band center frequency. FIG. 8 to FIG. 10 indicate that the projector having the enlarged part can lower the frequency and the sound pressure level.

While the embodiment of the present invention has been described in detail, it is to be understood that the present invention is not limited to the embodiment. It will be obvious that various changes may be made without departing from the spirit of the invention described in the claims of the present invention.

Figure 11:
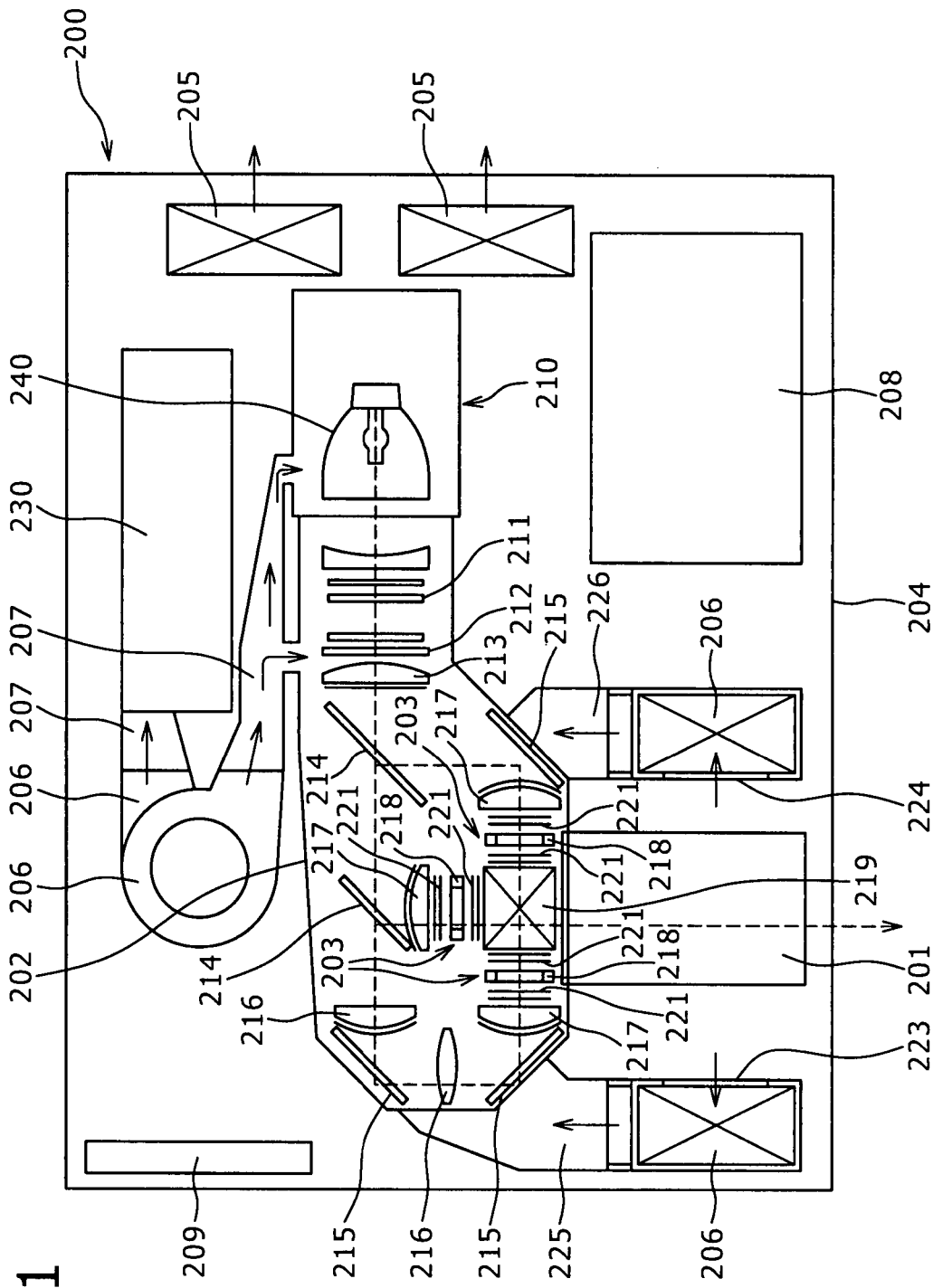
FIG. 11 is a diagram showing the configuration of a projector in another embodiment of the present invention.

For example, FIG. 11 shows the configuration of another projector 200 that has the burst sound reduction structure in this embodiment. Referring to FIG. 11, the projector 200 has an external cabinet 204 and, within this external cabinet 204, has an enclosed-type lamp device 210 which is a light source, and an optical system unit 202 included. A video or image obtained by exposing the light, output from the enclosed-type lamp device 210, onto light bulbs 203 of the optical system unit 202 is projected via a projection lens 201 onto a screen.

The external cabinet 204 also includes a sirocco fan 206, which cools a lamp unit 240 and the optical system unit 202, an axial flow fans 205 via which the heat of the lamp unit 240 and the optical system unit 202 is exhausted, a power supply circuit unit 230 that supplies power to the enclosed-type lamp device 210 and so on, a signal processing circuit unit 208, and an operation unit 209.

The optical system unit 202 includes a fry eye lens 211, a polarization converting element 212, a condenser lens 213, a dichroic mirror 214, a total reflection mirror 215, a relay lens 216, a field lens 217, three-color light bulbs 203 that have a liquid crystal panel 218 used as a display element, a prism 219, and the projection lens 201.

In this optical system unit 202, an un-polarized white light emitted from the lamp unit 240 is converted first to a linearly polarized light through the fry eye lens 211 and the polarization converting element 212 and is collected by the condenser lens 213 into an even, white light without brightness unevenness. The white light without bright unevenness is input to the three light bulbs 203 via the dichroic mirror 214.

At this time, the white light is separated by the dichroic mirror 214, which is color separation means, into the red color, green color, and blue color. The red color is collected by the field lens 217 via the relay lens 216, the total reflection mirror 215, another relay lens 216, and another total reflection mirror 215 and is input to the light bulb 203 for the red color.

The green color is collected by the field lens 217 via another dichroic mirror 214 and is input to the light bulb 203 for the green color. The blue color is collected by another field lens 217 via the dichroic mirror 214 and another total reflection mirrors 215 and is input to the light bulb 203 for the blue color.

Each of the three light bulbs 203 has two polarization plates 221, one on the input side and the other on the output side of the liquid crystal panel 218. The direction of polarization of each color light is aligned by the polarization plate 221 on the input side and is input to the liquid crystal panel 218. The liquid crystal panel 218 modulates each color light by the video signal applied corresponding to each color, and the three modulated colors are transmitted through the polarization plate 221 on the output side and polarized into an image for input to the prism 219. The images of the colors are combined by the prism 219, and the combined image is projected on the screen by the projection lens 201 as a full-color image.

The sirocco fan 206 sends air to the enclosed-type lamp device 210, the optical system unit 202, and the power supply circuit unit 230 via a duct 207 to cool them.

The sirocco fans 206 are provided on both sides of the projection lens 201. The sirocco fans 206 are provided, with air intake slots 223 and 224 facing the projection lens 201, to send air to the area of the light bulbs 203 of the optical system unit 202 via thin ducts 225 and 226 to cool the bulbs.

The lamp burst sound reduction structure and the projector according to the embodiment of the present invention lowers the frequency, the tone quality, and the sound pressure of a burst sound generated by the lamp light emitting unit, thus preventing the user from being surprised and suppressing uncomfortable sounds offensive to the ears.

It should be understood by those skilled in the art that various modifications, combinations, sub-combinations and alterations may occur depending on design requirements and other factors insofar as they are within the scope of the appended claims or the equivalents thereof.

The invention claimed is:
1. A projector comprising:
an optical system unit;
a lamp unit having (i) a light emitting unit, (ii) a concave reflecting mirror, and (iii) a translucent plate, said light emitting unit being a light source of the optical system unit and being located in a center of the concave reflecting mirror, said translucent plate being arranged so as to cover an opening of the concave reflecting mirror to form an inside portion of the concave reflecting mirror;
a duct arrangement; and
a cooling unit that during operation sends air through the duct arrangement to cool the lamp unit,
in which the duct arrangement includes (i) a first exhaust duct located in an air exhaust side of the lamp unit and which connects to the light emitting unit by way of an air exhaust slot formed on the concave reflecting mirror and (ii) a second exhaust duct located in the air exhaust side of the lamp unit and which connects to an outside portion of the concave reflecting mirror,
in which an enlarged part is provided in an intermediate position of the first exhaust duct in which said intermediate position, is located between a first opening and a second opening of the first exhaust duct such that during operation the enlarged part receives cooling air which passed through the inside portion of the concave reflecting mirror and does not receive cooling air which passed on the outside portion of the concave reflecting mirror, said first opening being an entrance for the first exhaust duct and being positioned adjacent to the air exhaust slot, formed on the concave reflecting mirror and said second opening being an exit for the first exhaust duct, and
in which said enlarged part has a square-shaped cross section area which is larger than that of all other portions of the first duct including a first portion adjacent to the first opening and a second portion directly adjacent to the second opening, the square-shaped cross section area being taken in a direction which is parallel to or substantially parallel to a direction in which the air flows in the enlarged part.

* * * * *